US012446727B2

(12) United States Patent
Shei (10) Patent No.: US 12,446,727 B2
(45) Date of Patent: Oct. 21, 2025

(54) VERTICAL HEAT TRANSFER DEVICE (71) Applicant: Marmon Foodservice Technologies, Inc., Osseo, MN (US)

(72) Inventor: Steven Shei, Fort Wayne, IN (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 268 days.

(21) Appl. No.: 17/031,421

(22) Filed: Sep. 24, 2020

(65) Prior Publication Data

US 2021/0085125 A1    Mar. 25, 2021

Related U.S. Application Data (60) Provisional application No. 62/905,726, filed on Sep. 25, 2019.

(51) Int. Cl.
A47J 37/06 (2006.01)

(52) U.S. Cl.
CPC ....... *A47J 37/0688* (2013.01); *A47J 37/0641* (2013.01); *A47J 37/0664* (2013.01)

(58) Field of Classification Search
CPC ...... A47J 37/044; A47J 37/045; A47J 37/047; A47J 37/048; A47J 37/042; A47J 37/041; A47J 37/0611; A47J 37/0623; A47J 37/0629; A47J 37/0647; A47J 37/0658; A47J 37/0664; A47J 37/0688; A47J 37/0857; A47J 36/24; A47J 39/02; A47J 39/00; A47J 37/049; A47J 37/0722; A47J 37/0807; A47J 37/0864; H05B 3/0009; F24C 7/04; F24C 15/166; F24C 15/18;
(Continued)

(56) References Cited

U.S. PATENT DOCUMENTS 3,087,418 A    4/1963  Albright
3,229,616 A    1/1966  Reese
(Continued)

FOREIGN PATENT DOCUMENTS

EP    2384135       8/2013
WO    2020091840    5/2020

OTHER PUBLICATIONS

"Nieco Model FH94 Gas Owner's Manual", Nieco, retrieved from https://nieco.com/wp-content/uploads/2020/04/FH94G-Manual-2020.pdf on Oct. 28, 2020.
(Continued)

*Primary Examiner* — Sang Y Paik
*Assistant Examiner* — Bonita Khlok
(74) *Attorney, Agent, or Firm* — Andrus Intellectual Property Law, LLP (57) ABSTRACT A heat transfer device for thermal treatment of food items includes an enclosure defining an interior of the heat transfer device. A first and second driven conveyor systems are positioned within the enclosure. A first primary heater is arranged interior of the first chain conveyor belt. A first chain heater is arranged proximate to the first chain conveyor belt at a location of the first chain conveyor belt proximate to the opening. A second primary heater is arranged interior of the second chain conveyor belt. A second chain heater is arranged proximate to the second chain conveyor belt at a location of the second chain conveyor belt proximate to the opening.

21 Claims, 4 Drawing Sheets (58) Field of Classification Search
CPC ... F24C 15/2007; A21B 1/40–48; A21B 1/26; A21B 3/04
USPC ......... 99/389, 401, 468, 471, 473–474, 477, 99/443 R–443 C, 447, 386, 360–363, 391
See application file for complete search history.

(56) References Cited

U.S. PATENT DOCUMENTS

| | | | |
|---|---|---|---|
| 3,646,879 A | 3/1972 | Palmason et al. | |
| 3,646,880 A * | 3/1972 | Norris | A47J 37/044 219/244 |
| 3,739,712 A | 6/1973 | Duning | |
| 3,937,270 A * | 2/1976 | Hazelett | B22D 11/0605 164/121 |
| 4,373,431 A * | 2/1983 | Wallick | A47J 37/044 99/441 |
| 4,389,562 A | 6/1983 | Chaudoir | |
| 4,881,519 A | 11/1989 | Henke | |
| 4,951,648 A | 8/1990 | Shukla et al. | |
| 5,044,264 A * | 9/1991 | Forney | B65G 15/38 99/425 |
| 5,179,265 A | 1/1993 | Sheridan et al. | |
| 5,253,564 A | 10/1993 | Rosenbrock et al. | |
| 5,588,354 A * | 12/1996 | Stuck | A47J 37/044 99/477 |
| 5,724,886 A | 3/1998 | Ewald et al. | |
| 5,947,012 A | 9/1999 | Ewald et al. | |
| 6,119,587 A | 9/2000 | Ewald et al. | |
| 6,209,447 B1 | 4/2001 | Ewald et al. | |
| 6,281,478 B2 * | 8/2001 | Chandler | A47J 37/044 198/860.5 |
| 6,358,548 B1 | 3/2002 | Ewald et al. | |
| 6,595,117 B1 | 7/2003 | Jones et al. | |
| 6,607,766 B2 | 8/2003 | Ewald et al. | |
| 6,624,396 B2 | 9/2003 | Witt et al. | |
| 6,786,422 B1 | 9/2004 | Wortman et al. | |
| 6,817,283 B2 | 11/2004 | Jones et al. | |
| 7,026,579 B2 * | 4/2006 | Burtea | A21B 1/48 99/443 C |
| 7,036,426 B2 | 5/2006 | Cheung | |
| 7,038,172 B1 | 5/2006 | Stuck | |
| 7,091,452 B2 | 8/2006 | Kingdon et al. | |
| 7,105,779 B2 | 9/2006 | Shei | |
| 7,227,102 B2 | 6/2007 | Shei | |
| 7,297,903 B1 | 11/2007 | March et al. | |
| 7,303,776 B2 | 12/2007 | Sus et al. | |
| 7,340,992 B1 | 3/2008 | Wolfe et al. | |
| 7,726,967 B2 | 6/2010 | Best | |
| 7,765,918 B2 | 8/2010 | Garniss et al. | |
| 7,800,023 B2 | 9/2010 | Burtea et al. | |
| 7,851,727 B2 | 12/2010 | Burtea et al. | |
| 7,853,129 B2 | 12/2010 | Best | |
| 7,905,173 B2 | 3/2011 | Sus et al. | |
| 7,921,767 B2 | 4/2011 | Cook et al. | |
| 8,033,213 B2 | 10/2011 | Cook et al. | |
| 8,087,407 B2 | 1/2012 | Wiker et al. | |
| 8,234,972 B2 | 8/2012 | Sands et al. | |
| 8,272,320 B2 | 9/2012 | Baker et al. | |
| 8,281,779 B2 | 10/2012 | Wiker et al. | |
| 8,371,285 B2 | 2/2013 | Wiker et al. | |
| 8,522,675 B2 | 9/2013 | Veltrop | |
| 8,656,904 B2 | 2/2014 | Wortman et al. | |
| 8,695,489 B2 | 4/2014 | Ewald et al. | |
| 8,839,714 B2 | 9/2014 | Schjerven, Sr. et al. | |
| 8,839,779 B2 | 9/2014 | Wiker et al. | |
| 8,997,636 B2 | 4/2015 | Kirby et al. | |
| 9,049,875 B2 | 6/2015 | Ewald et al. | |
| 9,433,321 B2 | 9/2016 | Piazzi | |
| 9,585,400 B2 | 3/2017 | Wiker et al. | |
| 9,585,401 B2 | 3/2017 | Wiker et al. | |
| 9,609,981 B2 | 4/2017 | Schjerven, Sr. et al. | |
| 9,693,655 B2 | 7/2017 | Shei et al. | |
| 9,980,322 B1 | 5/2018 | Kestner et al. | |
| 10,004,358 B2 | 6/2018 | Wildebush | |
| 10,039,289 B2 | 8/2018 | Wiker et al. | |
| 10,244,894 B2 | 4/2019 | Boltz et al. | |
| 10,362,898 B2 | 7/2019 | Schjerven, Sr. et al. | |
| 2003/0042248 A1 | 3/2003 | Witt et al. | |
| 2003/0056658 A1 | 3/2003 | Jones et al. | |
| 2003/0230200 A1 | 12/2003 | Cheung | |
| 2005/0132899 A1 * | 6/2005 | Huang | A23L 5/17 99/386 |
| 2008/0032018 A1 * | 2/2008 | Garniss | A47J 37/044 426/523 |
| 2008/0289619 A1 | 11/2008 | Schjerven, Sr. et al. | |
| 2009/0092718 A1 * | 4/2009 | Mendenhall | B65B 25/22 426/520 |
| 2010/0058936 A1 | 3/2010 | Schjerven, Sr. et al. | |
| 2011/0059211 A1 * | 3/2011 | Chandi | A21D 8/06 426/243 |
| 2011/0226230 A1 | 9/2011 | Reese et al. | |
| 2014/0199446 A1 | 7/2014 | Huegerich | |
| 2015/0118378 A1 | 4/2015 | Jones et al. | |
| 2016/0296068 A1 | 10/2016 | Schjerven, Sr. et al. | |
| 2017/0035234 A1 | 2/2017 | Schjerven, Sr. et al. | |
| 2017/0328598 A9 | 11/2017 | Wortman et al. | |
| 2018/0148264 A1 * | 5/2018 | Pollock | B65G 15/42 |
| 2018/0289209 A1 | 10/2018 | Yazvin et al. | |
| 2018/0296035 A1 | 10/2018 | Wildebush | |
| 2018/0338503 A1 | 11/2018 | Wiker et al. | |
| 2019/0232651 A1 * | 8/2019 | Kaburagi | B41J 3/00 |
| 2019/0290063 A1 | 9/2019 | Shei | |
| 2020/0182484 A1 * | 6/2020 | Cowan | F24C 15/2042 |

OTHER PUBLICATIONS

"Nieco FH94 Back of House: The Broiler Built by Combining 45 years of BK Experience & Innovation", Nieco, published Oct. 2019, retrieved from https://nieco.com/wp-content/uploads/2019/10/Nieco-FH94-Sales-Sheet.pdf on Oct. 28, 2020.

* cited by examiner

VERTICAL HEAT TRANSFER DEVICE

CROSS REFERENCE TO RELATED APPLICATIONS

The present application claims priority to U.S. Provisional Patent Application No. 62/905,726 filed on Sep. 25, 2019, the contents of which is incorporated by reference herein in its entirety.

BACKGROUND

The present disclosure relates to heat treatment of food. More specifically, the present disclosure relates to a vertical arrangement of a food heat transfer device, for example a broiler.

Heat transfer systems are used to provide thermal energy to a broiler, oven, toaster, or the like for use in the heat treatment of food items to achieve cooking, baking, or toasting of the food item. The heat transfer system may be a broiler, an oven, a toaster, or the like. Conveyor systems move the food item in the heat transfer system to achieve a continuous cooking, baking, or toasting process. In the present disclosure, the example of a driven chain belt charbroiler cooking a hamburger patty will be used, although it will be recognized that other forms of broilers, ovens, or toasters may be similarly configured and other foods, including but not limited to bread, buns, toasted sandwiches, chicken cuts or patties, fish cuts or patties, beef cuts, plant or other protein patties, or the aforementioned hamburger patties may be heat treated in manners as described herein.

Heat transfer devices, for example toasters or broilers are known to be vertical, although vertical toasters are more commonly found in the field. However, broiling of protein presents additional challenges to that of toasting of bread products as while the protein is cooked, significantly more water, grease, or fat is released from the protein as opposed to the baked good. This material can build up within the broiler and degrade component parts, reduce performance, or result in uncontrolled combustion of the combustible portions of this collected material. Furthermore, the nature of the heat treatment of broiling protein is different from that of toasting as a searing treatment of the protein is frequently desired by customers. Searing is the localized burning or charring of surface protein brought about by an application of high heat transfer at the start of the cooking process. Therefore, solutions that address these issues in beneficial ways are desired.

BRIEF DISCLOSURE

An example of a heat transfer device for thermal treatment of food items includes an enclosure defining an interior of the heat transfer device, the enclosure having an opening therein to receive a food item for thermal treatment. A first driven conveyor system is positioned within the enclosure and includes a first chain conveyor belt. A second driven conveyor system is positioned within the enclosure and includes a second chain conveyor belt. The second chain conveyor belt is positioned opposed to the first chain conveyor belt. A first primary heater is arranged interior of the first chain conveyor belt. A first chain heater is arranged proximate to the first chain conveyor belt at a location of the first chain conveyor belt proximate to the opening. A second primary heater is arranged interior of the second chain conveyor belt. A second chain heater is arranged proximate to the second chain conveyor belt at a location of the second chain conveyor belt proximate to the opening.

Other examples of the heat transfer device may include the first chain heater being operable to direct heat energy to the first chain conveyor belt to increase a temperature of the first chain conveyor belt proximate the opening and the second chain heater being operable to direct heat energy to the second chain conveyor belt to increase a temperature of the second chain conveyor belt proximate the opening. The first primary heater may be arranged to direct heat energy past the first chain conveyor belt into a food item conveyed by the first chain conveyor belt, and the second primary heater may be arranged to direct heat energy past the second chain. The heat transfer device may be oriented vertically, configured to receive the food item through the opening and to direct the food item downwardly from the opening between the first chain conveyor belt and the second chain conveyor belt. The food item may include a first plane elongated in the length dimension and the width dimension and heat transfer device is configured to receive the food item with the first plane of the food item oriented vertically. At least one movable baffle may be configured to direct gasses within the enclosure and heated by the primary cooking heaters in the direction of the opening for thermal treatment of the food item by the directed gasses.

A controller may be configured to control the primary cooking heaters between a cooking operation with at least a first temperature and a standby operation with at least a second temperature. The controller is configured to control the first and second chain heaters to emit heat energy into the first and second chain conveyor belts. The first conveyor system may include a first set of gears and the second conveyor system comprises a second set of gears. The first and second sets of gears positioned proximate the opening. The first and second chain conveyor belts move respectively about the first and second sets of gears. The first chain heater may be positioned internally to the first set of gears. The second chain heater may be positioned internally to the second set of gears. First and second plenums positioned respectively relative first and second chain heaters, and the first and second plenums are respectively pneumatically connected to at least one blower configured to direct air through the first and second plenums and against the first and second chain conveyor belts.

In further examples of the heat transfer device, the controller is configured to selectively control the first chain heater or the second chain heater to emit heat energy. A proximity sensor may be arranged relative to the opening to detect a food item passing through the opening into the interior of the enclosure. The controller may operate the primary cooking heaters in the cooking operation based upon detection of a food item by the proximity sensor. The controller may operate the first and second chain heaters to maintain the first chain conveyor belt and the second chain conveyor belt at a searing temperature during the cooking operation and during the standby operation. The controller may operate the first and second chain heaters to a maintenance temperature and the controller operates at least one of the first and second chain heaters to a searing temperature based upon detection of the food item by the proximity sensor. The first chain conveyor belt and the second chain conveyor belt sear portions of opposing surfaces of the food item. At least one vent through the enclosure and at least one vent cover operable by the controller to open or occlude the vent, and the controller operates the at least one vent cover to close during the standby operation to retain heat energy within the enclosure.

Examples of the heat transfer device may include a least one blower configured to direct air against at least one of the first and second chain conveyor belts. The controller may operate to receive an input indicating searing of a food item on a single side of the food item and the controller operates the at least one blower to cool the second chain conveyor belt. The controller may operate upon receiving the input indicating searing of the food item on the single side of the food item the controller operates the first chain heater at a searing temperature and operates the second chain heater to an off or standby temperature. First and second plenums positioned respectively relative first and second chain heaters. The first and second plenums are respectively pneumatically connected to the at least one blower and the first and second plenums are configured to direct air through the first and second plenums and against the first and second conveyor chains.

DETAILED DISCLOSURE

Figure 1:
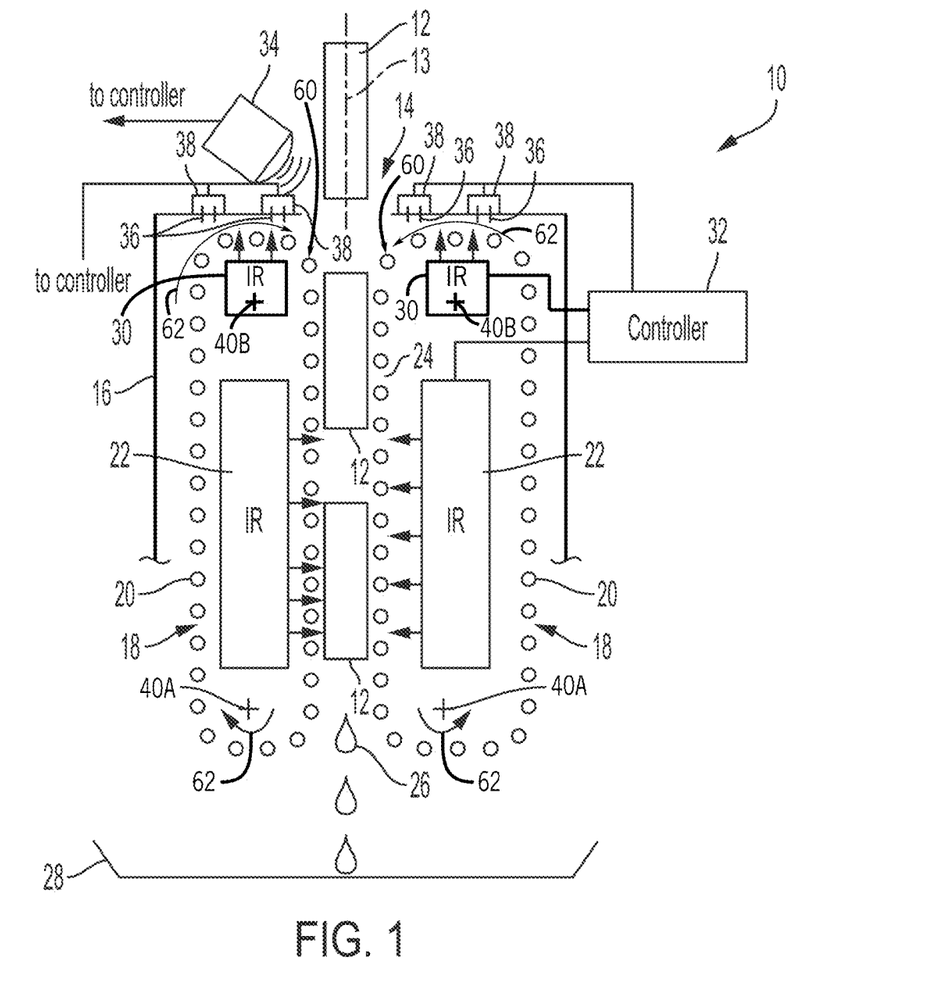
FIG. 1 depicts a heat transfer device.

FIG. 1 depicts an example of a vertically oriented heat transfer device 10. The heat transfer device 10 is exemplarily depicted and configured for the broiling of a protein, for example, a hamburger patty 12. It will be recognized that while this example is used for disclosure purposes, the features as disclosed herein may be used in other heat transfer devices, for example toasters or horizontally oriented broilers. Examples of heat transfer devices or toasters are provided in U.S. Patent Application Publication No. 2018/0289209, entitled "Toaster with Adjustable Conveyor," which is incorporated herein by reference in its entirety. Examples of other heat transfer devices or broilers are provided in U.S. Patent Application Publication No. 2019/0290063 entitled "Heat Transfer System" which is also incorporated by reference herein in its entirety.

In the heat transfer device 10 of FIG. 1, the hamburger patty 12 is received through an opening 14 in an enclosure 16. The enclosure 16 is exemplarily constructed of sheet metal of stainless steel or other metal. Within the enclosure 16, two driven conveyor systems 18 each include a chain conveyor belt 20. The chain conveyor belts 20 are driven about conveyor gears 40 in opposite directions as indicated by arrows 62 such that the chain conveyor belts 20 simultaneously contact the hamburger patties 12 at points of initial contact 60 and pull the hamburger patties 12 through the heat transfer device 10. The conveyor gears 40 may be one set be driven and the other set for alignment, with the alignment gear 40B exemplarily closer to the opening 14 and the driven gear 40A exemplarily away from the opening 14.

The food item, exemplarily a hamburger patty, for example may have a planar shape. The planar shape of the hamburger patty may exemplarily make the hamburger patty elongated in length and width dimensions. In an example, an axis 13 of this plane is oriented vertically. The food item is thus received into the heat transfer device 10 in a vertical orientation. While examples provided herein also orient the chain conveyor belts 20 in a vertical orientation, it is recognized that further examples of a vertical heat transfer device are oriented to hold the food item, exemplarily a hamburger or protein patty, in a same vertical orientation, while the device moves the food item through the device in an exemplary horizontal manner. One example of such an arrangement is depicted and described in U.S. Patent Application Publication No. 2015/0118378, entitled "Vertical Broiler" which is incorporated herein by reference in its entirety.

Figure 2:
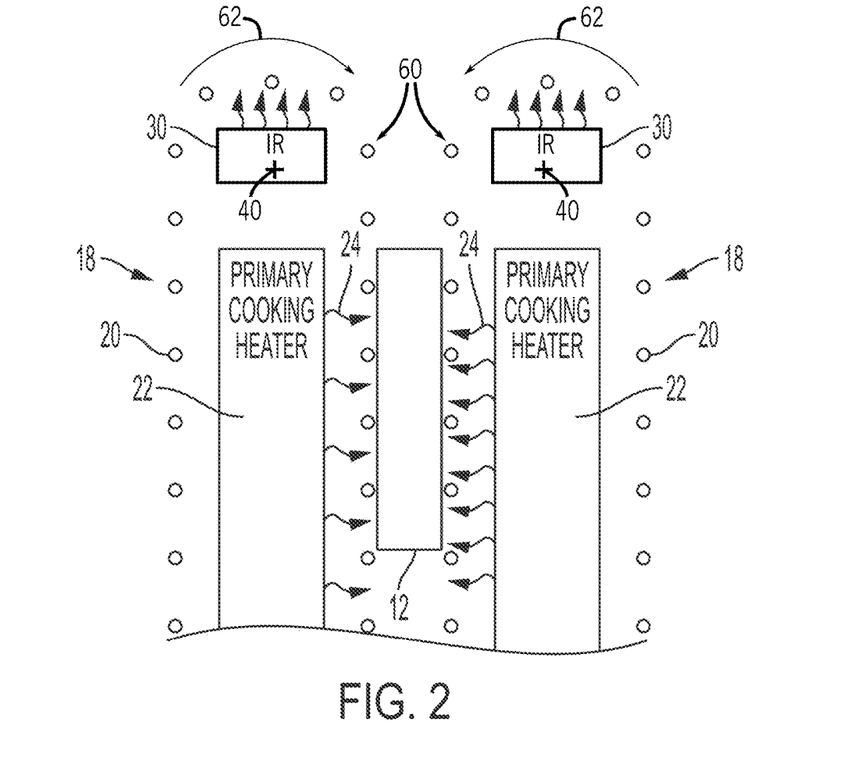
FIG. 2 is a detailed view of a portion of a heat transfer device.

FIG. 2 is a partial detailed view of the driven conveyor systems 18 within the enclosure 16. Primary cooking heaters 22 are arranged internally to the chain conveyor belt 20. From this position, the primary cooking heaters 22 emit heat energy, primarily in the form of radiantly transferred heat, and further exemplarily infrared (IR) energy. This heat energy is directed to each of the primary cooking heaters 22 past the respective chain conveyor belt 20 and into the hamburger patty 12 held between the two chain conveyor belts 20. The primary cooking heaters 22 may exemplarily be resistive wires, Calrods, gas combustion systems, LEDs, or other heat generators sufficient to produce the heat required for protein cooking as will be recognized by one of ordinary skill in the art in view of the present disclosure. Returning to FIG. 1, as the heat energy 24 produced by the primary cooking heaters 22 cooks the hamburger patty 12, water, grease, fat, and other substances, collectively "juice" 26 is released and by gravity drips down between the chain conveyor belt 20 and into a collection pan 28.

As previously noted, it is desirable for a heat transfer device 10 to achieve the culinary effect of searing when heat treating protein such as hamburger patties. It will be recognized that the searing effect typically occurs when a protein comes in contact with a solid surface having a temperature of about 500° F. or greater. However, it will be recognized that this temperature may be greater than the internal temperature of a heat treatment device, such device configured to cook, rather than to necessarily sear, the food. Therefore, the temperature of the chain conveyor belt 20 at the opening 14 when the hamburger patty 12 is received therein and makes initial contact at 60 with the chain conveyor belt 20 may not be sufficient to create a searing effect. Therefore, chain heaters 30 are positioned at a position proximate to the opening 14 such that the chain heaters 30 heat the chain conveyor belt 20 to a temperature sufficient to sear the hamburger patty 12 upon first contact at 60 with the chain conveyor belt 20. This initial heating of the chain conveyor belts 20 to a searing temperature both serves to provide localized searing and/or "grill marks" on both sides of the hamburger patty and causes the hamburger patty to stick to the chain conveyor belt 20 at the points of searing, helping to hold the hamburger patty 12 between the conveyor belts 20 as the patty 12 is moved through the heat transfer device 10. The chain heaters 30 are exemplarily positioned internally to the chain conveyor belt 20, but in other examples may be exterior of the chain conveyor belt 20, but otherwise within the enclosure 16.

The chain heater 30 may be any of the aforementioned heating systems as may be used for the primary cooking heater 22. As depicted in FIG. 1, the chain heater 30 is an IR burner that radiates heat energy into the chain conveyor belt 20. The chain heater 30 is located prior to the opening 14 and the point of initial contact 60 on the chain conveyor belt in the direction 62 in which the conveyor belt is driven to elevate the temperature of the chain conveyor belt at the point of initial contact 60. The chain heater 30 directs heat energy into the chain conveyor belt 20 at this location prior to the point of initial contact 60. Therefore, the points of initial contact 60 are after the alignment gears 40B along the chain conveyor belt 60 in the direction 62. Additionally, the chain heater 30 may be a heating system that is adapted for transfer of heat energy into the chain conveyor belt 20 itself rather than past the chain conveyor belt 20 into the food. In examples, such heating systems may use one or more of conductive, convective, radiative, or inductive heating. In an example, the chain heater 30 may be an inductive heater. While the chain heaters 30 may be the same type of heating system as the primary cooking heaters 22, it will be recognized that different heating systems may be used as well.

In addition to the benefits described above, the system incorporating the chain heater 30 and primary cooking heaters 22 as described herein may also be operated in manners that exhibit improved energy efficiency. In typical heat transfer devices, the entire system is heated to an operating temperature through a preheating cycle and through continuous operation of the primary cooking sources to maintain the temperature within the cooking zone of the device as well as to heat the chain conveyor belt 20 to a searing temperature. In an embodiment wherein the primary cooking heaters 22 produce heat energy 24 in the form of IR radiation, such heat energy directed locally into the hamburger patty as it passes the primary cooking heaters 22 need not rely upon having the entire cooking zone within the enclosure 16 being maintained at the cooking temperature. Thus, the primary cooking heaters 22 need only be operated when a hamburger patty 12 is known to be in the proximity of the primary cooking heaters 22. A controller 32 can provide the necessary control signals to the primary cooking heaters 22 to operate the primary cooking heaters 22 between cooking and standby operations. In the standby operations the primary cooking heaters are operated in a low or no energization condition. The chain heaters 30 are operated at a higher level of energization in order to maintain a temperature of the chain conveyor belts 20, although in a standby condition, the controller 32 may also operate the chain heater 30 to operate at a maintenance temperature below the full energization required to bring the chain conveyor belt 20 to a searing temperature. The proximity sensor 34 arranged near the opening 14 may be a light break sensor, a digital camera and computer vision system, a temperature sensor, or other type of sensor which can detect the hamburger patty 12 at the opening 14 as it enters the enclosure 16. Upon detection of a hamburger patty 12 entering the heat transfer device 10, the controller can change from operation in the standby mode to operation in a cooking mode whereby the chain heater 30, if it was not already operating at a power sufficient to achieve a searing temperature of the chain conveyor belt 20, is powered up to increase the temperature of the chain conveyor belt 20 and the primary cooking heaters 22, which are operated to emit the heat energy 24 to achieve the cooking of the hamburger patty.

It will be recognized that the controller 32 is exemplarily any of a variety of known controller circuits, integrated circuits, microcontrollers, microprocessors, and associated circuitry. The controller 32 may exemplarily include a central processing unit (CPU) and integrated memory in the form of a computer-readable medium (CRM), although in embodiments the computer-readable medium comprising the memory may be a separate component or communicatively connected to the controller 32 within the heat transfer device. The controller 32 exemplarily includes a processor that accesses software or firmware in the form of computer-readable code stored on the non-transient computer-readable medium as either integrated memory or external memory. The processor executes the computer-readable code as an instruction set to carry out the functions as described herein, including the receipt of input, calculations, and outputs in the form of operational or command signals.

It will be recognized that different operations of the heat transfer device 10 as carried out by the controller 32 provide command signals to components of the heat transfer device 10. For example, the primary cooking heater 22, the chain heater 30, and the drive assemblies (not depicted) of the driven conveyor systems 18 can be operated to carry out the cooking by the heat transfer device 10. The heat treatment of the hamburger patty or other protein through the heat transfer device 10 is primarily a function of the heat energy emitted from the primary cooking heaters 22 and the speed at which the chain conveyor belts 20 move the patties through the heat transfer device. The intensity or prominence of the sear marks are similarly controlled by the temperature of the chain conveyor belt 20 when first contacting the hamburger patty 12 at the point of initial contact 60. Therefore, operation of the chain heater 30 controls the resulting sear marks. By control of these functions of the heat transfer device 10, the controller 32 can operate the heat transfer device 10 to cook different types, thicknesses, or forms of protein, as well as to achieve different cooking temperatures of the cooking protein.

In an example, the controller 32 may receive a user input or a system input identifying a type of protein to be cooked, and the resulting operational conditions to be carried out by the controller to cook such protein. The user inputs may indicate a food item e.g. hamburger), item size (e.g. ¼ patty), and desired temperature (medium-well). The controller 32 is configured with operational data that indicates an associated conveyor speed and/or primary cooking heater energy output. Furthermore, a user input can indicate that sear marks should appear on one or both sides of the food item. As will be explained in further detail herein, the controller 32 is configured with operational data to operate one or both of the chain heaters 30 to achieve heat treatment of the food item according to this user input.

Additionally, FIG. 1 depicts an optional feature of a plurality of vents 36 through the enclosure 16 and exemplarily through a top of the enclosure 16 in an area above the driven conveyor systems 18 and in a vicinity of the opening 14. The vents 36 can operate to release cooking and/or combustion gases from inside of the enclosure 16 during the cooking process. Examples of the heat transfer device 10 may further include vent covers 38, which may be operable by the controller 32, for example through electromechanical actuators to position the vent covers 38 relative to the vents 36 to open and close the vents 36 thereby permitting or occluding airflow through the vents 36. In an example, when the controller 32 operates the heat transfer device 10 in a standby mode, the controller 32 may operate the vent covers 38 to close the vents 36, thereby limiting the dissipation of heat from the interior of the enclosure 16 and helping to maintain a temperature of the chain conveyor belt 20 which may promote efficient of use of the chain heater 30 to maintain the chain conveyor belt 20 at a searing temperature, or to help maintain the chain conveyor belt 20 at a temperature that can be quickly raised to the searing temperature upon detection of a hamburger patty 12 entering the opening 14. It will be recognized that examples of the vents 36 and/or vent covers 38 as depicted in FIG. 1 may be used in combination with other features as described herein.

Figure 3:
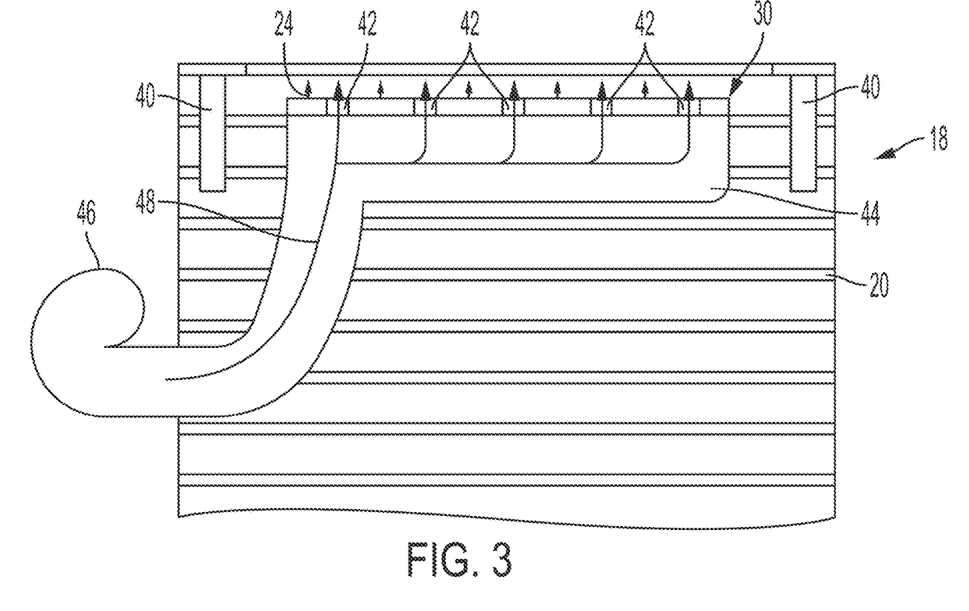
FIG. 3 is a partial sectional view of an example of a conveyor system.

FIG. 3 is a partial, cross-sectional view through an example of a driven conveyor system 18. The chain conveyor belt 20 is depicted and wraps around conveyor gears 40. In certain examples, the conveyor gears 40 may be driven gears or alignment gears, although it will be recognized that a driven conveyor system 18 will require at least one set of driven gears, although those gears may be located at the top or the bottom of the driven conveyor system 18. In an example the driven conveyor gears are located at an end of the conveyor belt 20 opposite the opening 14. The chain heater 30 is positioned internal to the chain conveyor belt 20 between the conveyor gears 40, but at a position proximal to the chain conveyor belt 20 such that heat energy 24 can be directed from the chain heater 30 into the chain conveyor belt 20 to bring the chain conveyor belt 20 to a searing temperature, if so operated.

While searing may be frequently desirable in heat treatment processes, there may be some cooking operations or specific proteins wherein such searing is not desired. In other examples, the restaurant may have a preference to have sear marks only on a single side of a piece of protein as opposed to both sides. It is thus desirable for the heat transfer device 10 to be able to selectively provide sear marks on either or both sides of the protein cooked therein. It therefore may be desirable to cool the chain conveyor belt 20 to a temperature below a searing temperature prior to contact with the food item with the chain conveyor belt through the opening. The chain conveyor belt 20 will passively cool in the absence of input heat energy or the input of heat energy less than that required to maintain a current temperature of the chain conveyor belt 20. Cooling of the chain conveyor belt 20 may be furthered by opening of the aforementioned vents 36 as depicted in FIG. 1. However, in some instances, it may be desirable to actively cool the chain conveyor belt 20 to reach such temperatures more quickly.

FIG. 3 depicts an example of an optional way that the heat transfer device 10 may cool the chain conveyor belt 20. Holes 42 may be provided through the chain heater 30. As an alternative to holes, depending upon the structure of the chain heater 30 used, spaces between heating elements of the chain heater 30 may provide the same structure and function as holes 42. A plenum 44 is provided below the chain heater 30 and relative to the holes 42. The plenum 44 is pneumatically connected to a fan or blower 46. The blower 46 may take in air from outside of the enclosure 16 and create a positive pressure within the plenum 44, creating a flow of air 48 into the plenum 44 and out of the holes 42 to impinge upon the chain conveyor belt 20. This actively cools the chain conveyor belt 20. In a still further example, wherein the vents 36 and the vent covers 38 as previously described above are provided in the enclosure 16, the vent covers 38 may be opened to exhaust flow of air 48 out of the enclosure 16, further assisting the cooling of the chain conveyor belt 20.

Figure 4:
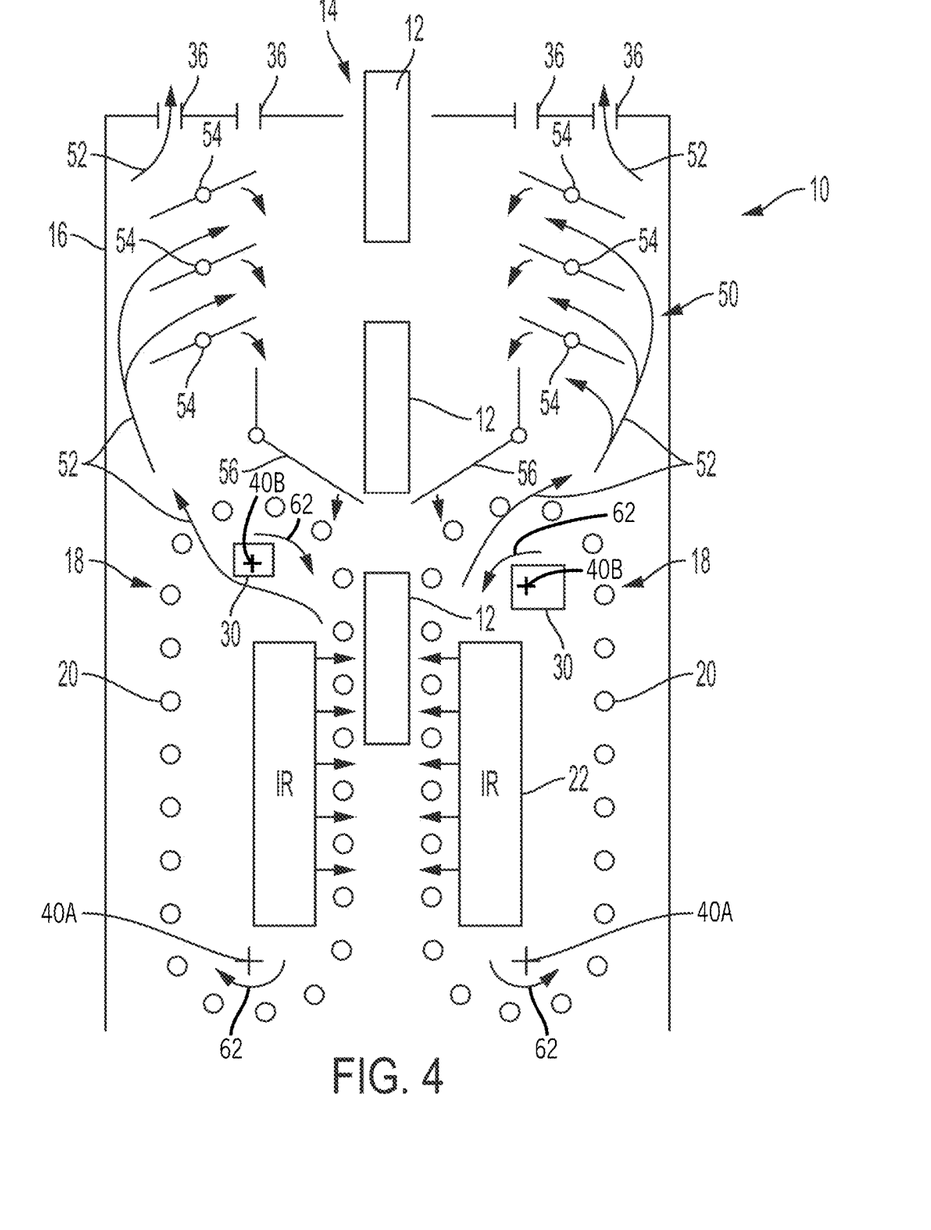
FIG. 4 depicts an example of a vertical heat treatment system with air ducting.

FIG. 4 depicts a further example of the heat transfer device 10 which includes a ventilation extension 50 to the enclosure 16. The ventilation extension 50 extends in a direction above the primary cooking heaters 22 and the driven conveyor systems 18, forming a space therein in which a flow of heated gasses 52 passes toward the vent 36. Operation of the primary cooking heater 22 and the chain heaters 30 heat the surrounding environment in addition to providing heat energy into the hamburger patty 12. This produces heated combustion gas and air within the enclosure 16. Due to thermodynamics, this heated gas rises through the enclosure 16, which first helps to maintain a temperature of the chain conveyor belt 20, improving efficiency of the operation of the chain heater 30 to achieve a searing temperature on the chain conveyor belt 20.

Additionally, baffles 54 positioned within the ventilation extension 50 are operable between an opened configuration, as depicted in FIG. 4, which redirects some or all of the flow of air 52 into the interior of the ventilation extension 50, and a closed configuration wherein the flow of air 52 is directed primarily out of the enclosure 16 through the vents 36. When the baffles 54 are in the open configuration, the flow of heated air 52 is directed toward an incoming hamburger patty 12 received through the opening 14 in the enclosure 16. This flow of heated air 52 can perform a preprocessing thermal treatment on the incoming hamburger patty 12, for example to provide a thawing, pre-cooking, or par-baking process with the recycled heated air from the primary cooking heater 22. While not depicted in FIG. 4, an inlet conveyance may be provided to direct the hamburger patties 12 from the opening 14 through this region to the driven conveyor systems 18. In non-limiting examples, such a conveyance may include a driven conveyor system as previously described, or may include a ramp, chute, or other physical barrier that directs the path of the incoming hamburger patty 12. Exemplarily, gates 56 may be positioned proximate to the driven conveyor systems 18 to slow and/or control the first contact of the hamburger patty 12 with the chain conveyor belts 20 of the driven conveyor system 18.

Examples as provided herein are exemplary in nature and it is recognized that a person of ordinary skill in the art will arrive at various modifications and alternatives from the disclosure provided herein. Such concepts are considered to be within the scope of the present disclosure. In examples of the heat transfer device 10, various implementations of the driven conveyor systems 18 and the chain conveyor belt 20 may be used, including systems that provide for adjusting and/or maintaining belt tension and compression of the hamburger patties 12 between the belts, as is known in the art.

In an example, the direction of the juices including water, grease, fat, and combustion debris away from the chain conveyor belt 20 and away from the primary cooking heaters 22 improve system maintenance and longevity of components due to reduced accumulation of these substances on the operational components of the heat transfer device and avoidance of the uncontrolled combustion of such material within the heat transfer device 10 during operation. The heat sources, including the primary cooking heaters and the chain heaters, may use gas or electric heat sources to produce infrared wavelength light energy or other heat energy transferred by radiant, convective, conductive, or inductive heat transfer. By using two heating systems to separately achieve the chain conveyor belt preheating searing effect with one system and to provide the cooking of the food product with another system, examples of the heat transfer device can start cooking food items from a cold or low-energy start, including a standby mode.

Examples of heat transfer devices that include a proximity sensor at the opening to the heat transfer device may initiate a change from a standby operation to a cooking operation which helps to limit energy use between cooking operations.

Information of an incoming food product may be received either from a proximity sensor 34 which may further take on the form of a camera, mechanical gate, optical break, pressure switch or other type sensor located near the opening 14, or provided by a user input to the heat transfer device either physically with a user interface or through a communicative connection to another device holding or dispensing the food product, or from a kitchen management system. This information can be used to control the heaters in between an active or stand-by operation. Similarly, the driven conveyor systems may be operated in active or stand-by modes to slow the conveyor speed when in a stand-by mode.

With the chain heater 30 located in the proximity of the chain conveyor belt 20 at a location proximate to the opening, the chain conveyor belt is heated to a temperature that sears the meat's surface in contact with the chain to produce the searing effect and grill marks on one or both surfaces of the food item. The intensity of the sear marks is related to the temperature of the cook chain which can be controlled by changing the intensity of the operation of the chain heater 30. Because the temperature of the chain conveyor belts of both of the driven conveyor systems 18 are independently controlled by respective chain heaters 30, sear marks can be selectively applied to one or both sides of the food item by the operation as disclosed herein.

An energy efficient heat transfer device may be provided in accordance with the present disclosure, for example, through the ability of the heat transfer device to enter the standby mode between cooking operation. Even in embodiments wherein the chain heaters must be continuously run at some or full strength to maintain a searing temperature of the cook chain, the chain heater 30 may be significantly smaller than the primary cooking heaters 22 due to the specific function and operation. Such chain heaters may operate at significantly less energy consumption than similar operation of the primary cooking heaters, thus achieving energy efficiency in a standby mode, even when the chain heaters 30 remain partially or fully operational. The further addition of the chain heater 30 separates control of the cooking of the food item from the production of searing or grill marks on the food item. This further enables flexibility of food item searing to produce unseared items or items with seared grill marks on a single side, or food items with seared grill marks on both sides with a single heat transfer device.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A heat transfer device for thermal treatment of food items, the heat transfer device comprising:
    an enclosure defining an interior of the heat transfer device, the enclosure having an opening therein to receive a food item for thermal treatment;
    a first driven conveyor system is positioned within the enclosure with a point of food item initial contact at the opening and comprises a first chain conveyor belt wherein the first chain conveyor belt is driven in a first direction from the opening into the interior;
    a second driven conveyor system is positioned within the enclosure with the point of food item initial contact at the opening and comprises a second chain conveyor belt, the second chain conveyor belt positioned opposed to the first chain conveyor belt, wherein the second chain conveyor belt is driven in a second direction from the opening into the interior, wherein the first and second directions are opposite to contact the food item at the point of food item initial contact between the first and second chain conveyor belts and pull the food item from the opening through the enclosure;
    a first primary heater arranged interior of the first chain conveyor belt and after the point of food item initial contact in the first direction of the first chain conveyor belt, the first primary heater configured to direct IR heat energy into the food item;
    a first chain heater positioned within the enclosure prior to the point of food item initial contact in the first direction of the first chain conveyor belt and prior to the opening in the first direction of the first chain conveyor belt and configured to direct heat energy into the first chain conveyor belt to increase the temperature of the first chain conveyor belt to a searing temperature at the opening;
    a second primary heater arranged interior of the second chain conveyor belt and after the point of food item initial contact in the second direction of the second chain conveyor belt, the second primary heater configured to direct IR heat energy into the food item; and
    a second chain heater positioned within the enclosure prior to the point of food item initial contact in the second direction of the second chain conveyor belt and prior to the opening in the second direction of the second chain conveyor belt and configured to direct heat energy into the second chain conveyor belt to increase the temperature of the second chain conveyor belt to the searing temperature at the opening.

2. The heat transfer device of claim 1, wherein the food item comprises a first plane elongated in a length dimension and a width dimension compared to a height dimension, and the first chain conveyor belt and the second chain conveyor belt are separated by a gap elongated in a vertical dimension, wherein the heat transfer device is configured to receive the food item within the gap with the first plane of the food item oriented vertically.

3. The heat transfer device of claim 2, wherein the first and second chain conveyor belts each comprise a cooking run between which the gap is defined and a return run opposite the cooking run, and wherein the first and second primary heaters are arranged along the cooking run to direct heat energy into the food item and the first and second chain heaters are arranged to direct heat energy into the respective first and second chain conveyor belts outside of the cooking run.

4. The heat transfer device of claim 3, wherein the first driven conveyor system comprises first alignment gears near the opening and first driven gears opposite the opening, wherein the cooking run of the first chain conveyor belt extends from the first alignment gears to the first driven gears and the return run of the first chain conveyor belt extends from the first driven gears to the first alignment gears in the first direction;

wherein the second conveyor system comprises second alignment gears near the opening and second driven gears opposite the opening, wherein the cooking run of the second chain conveyor belt extends from the second alignment gears to the second driven gears and the return run of the second chain conveyor belt extends from the second driven gears to the second alignment gears in the second direction;

wherein the first chain heater directs heat energy into the first chain conveyor belt at the first alignment gears and the second chain heater directs heat energy into the second chain conveyor belt at the second alignment gears.

5. The heat transfer device of claim 4, wherein the first chain heater is positioned internally to the first alignment gears and the second chain heater is positioned internally to the second alignment gears.

6. The heat transfer device of claim 4, further comprising a least one blower configured to direct air against at least one of the first and second chain conveyor belts.

7. The heat transfer device of claim 6, wherein the controller is configured to receive an input indicating searing of a food item on a single side of the food item and the controller operates the at least one blower to cool the second chain conveyor belt.

8. The heat transfer device of claim 7, wherein the upon receiving the input indicating searing of the food item on the single side of the food item the controller operates the first chain heater at a searing temperature and operates the second chain heater to an off or standby temperature.

9. The heat transfer device of claim 7, comprising first and second plenums positioned respectively relative first and second chain heaters, and the first and second plenums are respectively pneumatically connected to the at least one blower and the first and second plenums are configured to direct air through the first and second plenums and against the first and second conveyor chains.

10. The heat transfer device of claim 2, further comprising a collection pan positioned vertically below the gap between the first chain conveyor and the second chain conveyor.

11. The heat transfer device of claim 2, wherein the first chain heater and/or the second chain heater is configured to increase the temperature of the first and/or second chain conveyor belt immediately prior to the opening to a temperature of at least 500 degrees Fahrenheit to sear the food item to the first and/or second chain conveyor belt at the opening to retain the food item within the gap with the first plane of the food item oriented vertically.

12. The heat transfer device of claim 1, further comprising first and second plenums positioned respectively relative first and second chain heaters, and the first and second plenums are respectively pneumatically connected to at least one blower configured to direct air through the first and second plenums and against the first and second chain conveyor belts.

13. The heat transfer device of claim 1, wherein the first and second primary heaters are operable between a cooking operation with a first heat energy output and a standby operation with at least a second heat energy output, the second heat energy output lower than the first heat energy output.

14. The heat transfer device of claim 13, further comprising a proximity sensor arranged relative to the opening to detect the food item passing through the opening into the interior of the enclosure;

wherein the primary heaters operate in the cooking operation from the standby operation based upon detection of the food item by the proximity sensor.

15. The heat transfer device of claim 14, wherein the first and second chain heaters to maintain a first-third heat energy output during the cooking operation and during the standby operation.

16. The heat transfer device of claim 14, further comprising at least one vent through the enclosure and at least one vent cover operable to open or occlude the vent, and further wherein the at least one vent cover closes in coordination with the first and second primary heaters during the standby operation to retain heat energy within the enclosure.

17. The heat transfer device of claim 13, wherein the first and second chain heaters are selectively operable to emit heat energy.

18. The heat transfer device of claim 1, wherein the first primary heater is arranged to direct heat energy past the first chain conveyor belt into the food item, and wherein the second primary heater is arranged to direct heat energy past the second chain conveyor belt into the food item.

19. The heat transfer device of claim 1, wherein the heat transfer device is oriented vertically, configured to receive the food item through the opening and to direct the food item downwardly from the opening between the first chain conveyor belt and the second chain conveyor belt.

20. The heat transfer device of claim 1, further comprising at least one movable baffle configured to direct gasses within the enclosure and heated by the primary cooking heaters in the direction of the opening for thermal treatment of the food item by the directed gasses.

21. A heat transfer device for thermal treatment of food items, the heat transfer device comprising:

an enclosure defining an interior of the heat transfer device, the enclosure having an opening therein to receive a food item for thermal treatment;

a first driven conveyor system is positioned within the enclosure with a point of food item initial contact at the opening and comprises a first chain conveyor belt wherein the first chain conveyor belt is driven in a first direction from the opening into the interior;

a second driven conveyor system is positioned within the enclosure with the point of food item initial contact at the opening and comprises a second chain conveyor belt, the second chain conveyor belt positioned opposed to the first chain conveyor belt, wherein the second chain conveyor belt is driven in a second direction from the opening into the interior, wherein the first and second directions are opposite to contact the food item at the point of food item initial contact between the first and second chain conveyor belts and pull the food item from the opening through the enclosure;

a first primary heater arranged interior of the first chain conveyor belt and after the point of food item initial contact in the first direction of the first chain conveyor belt;

a first chain heater positioned within the enclosure prior to the point of food item initial contact in the first direction of the first chain conveyor belt and prior to the opening in the first direction of the first chain conveyor belt to direct heat energy into the first chain conveyor belt to increase the temperature of the first chain conveyor belt to a searing temperature at the opening;
a second primary heater arranged interior of the second chain conveyor belt and after the point of food item initial contact in the second direction of the second chain conveyor belt; and
a second chain heater positioned within the enclosure prior to the point of food item initial contact in the second direction of the second chain conveyor belt and prior to the opening in the second direction of the second chain conveyor belt to direct heat energy into the second chain conveyor belt to increase the temperature of the second chain conveyor belt to the searing temperature at the opening;
wherein the first and second primary heaters are configured to direct IR heat energy into the food item and wherein portions of the first chain conveyor belt and the second chain conveyor belt following the first and second primary heaters in the first direction of the first chain conveyor belt and the second chain conveyor belt are separated by a gap elongated in a vertical dimension, wherein the heat transfer device is configured to hold the food item oriented vertically within the gap between the first chain conveyor belt and the second chain conveyor belt and at least one of the first chain heater and the second chain heater is configured to increase the temperature of the respective at least one of the first chain conveyor belt and second chain conveyor belt to a temperature to sear the food item to at least one of the respective first chain conveyor belt and second chain conveyor belt to retain the food item vertically within the gap.

\* \* \* \* \*